United States Patent [19]

Perego

[11] 3,796,439
[45] Mar. 12, 1974

[54] FOLDING BABY CARRIAGE WHICH CAN BE CARRIED ON THE ARM

[76] Inventor: Giuseppe Perego, Via De Gasperi, 50, Arcore, Italy

[22] Filed: July 12, 1972

[21] Appl. No.: 271,111

[30] Foreign Application Priority Data
Feb. 26, 1972 Italy .......................... 21048/72

[52] U.S. Cl. .......................... 280/36 R, 280/47.37
[51] Int. Cl. .......................... B62b 11/00
[58] Field of Search ........ 280/36 B, 41 B; 16/110 R

[56] References Cited
UNITED STATES PATENTS
3,556,546 1/1971 Garner .......................... 280/36 B
2,470,040 5/1949 Mackin .......................... 280/41 B Primary Examiner—Robert R. Song
Attorney, Agent, or Firm—McGlew and Tuttle

[57] ABSTRACT

A baby carriage comprises a front frame having a lower end with a front wheel set and one or more rear wheels which are supported on a bracket of the front frame so that they may be shifted rearwardly to an operating position or folded into a collapsed position. The rear wheels are also carried on rods which may be pivoted in order to shift the rear wheels out of axial alignment with the running direction. The front frame also provides a pivotal support for a handle which comprises two U-shaped members which have first leg portions which are pivotal to a central upward extension of the front frame and mounted so that they may be shifted between an outwardly extending position in which they extend in opposite relative directions to provide a pushing handle and to a folded position in which they are overlapped and provide a carrying handle which may be carried by the operator's arm.

6 Claims, 5 Drawing Figures

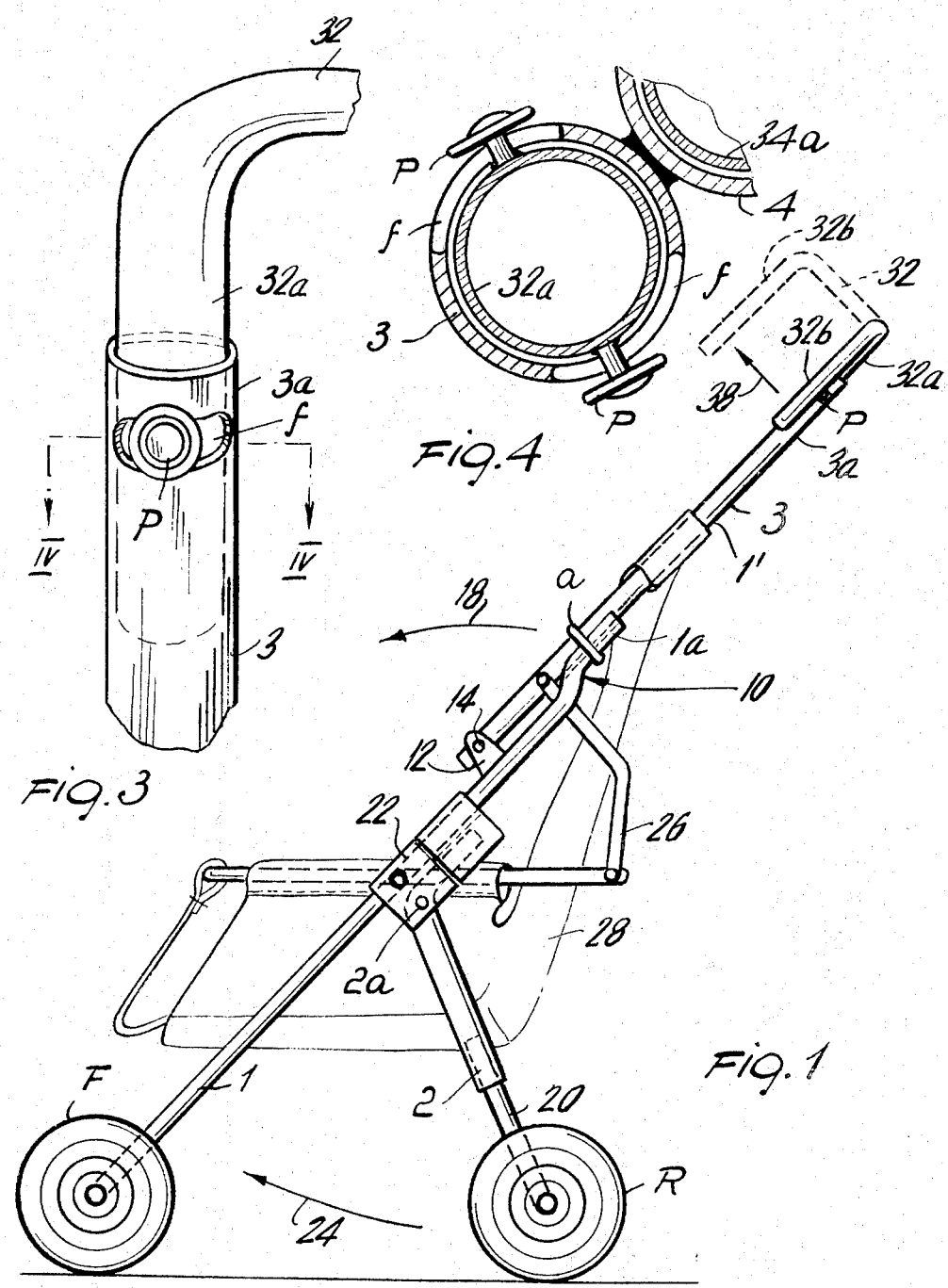

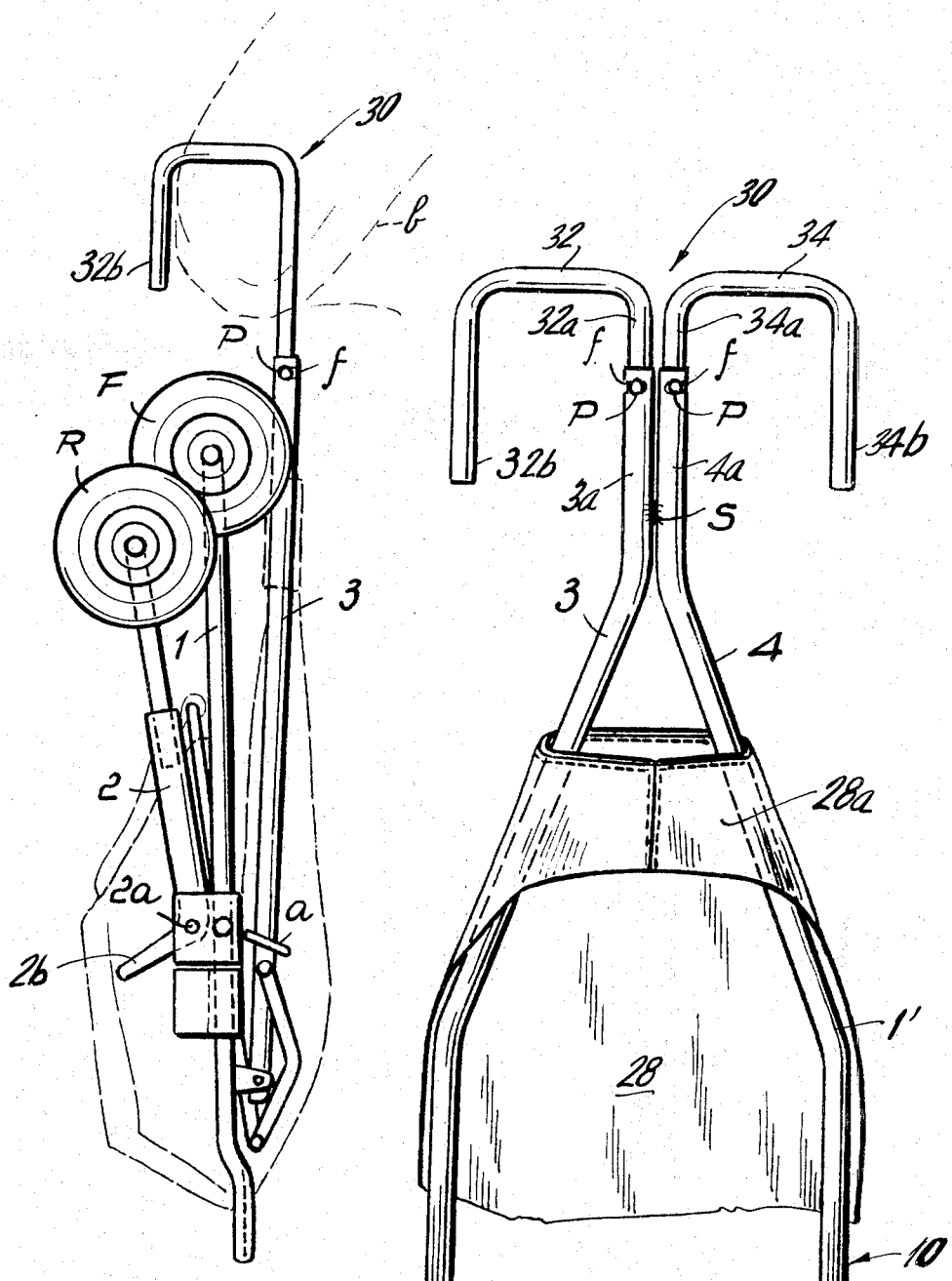

FOLDING BABY CARRIAGE WHICH CAN BE CARRIED ON THE ARM

BACKGROUND OF THE INVENTION

1. Field of the Invention

This invention relates in general to the construction of a baby carriage and in particular, to a new and useful baby carriage having collapsible front and rear wheel sets which are supported on a frame having a combined carrying and pushing handle.

2. Description of the Prior Art

Baby carriages are known which include frames for the support of front and rear wheels which are constructed so that the rear wheel supporting elements may be collapsed into juxtaposition with the front wheel elements so that the baby carriage may be easily stored or transported.

SUMMARY OF THE INVENTION

The present invention is an improvement over the prior art primarily in respect to the construction of a baby carriage which has a simple and easily collapsible front and rear wheel sets and which includes a frame which provides a pivotal support for a handle which may function either as a pushing handle or as an umbrella-type carrying handle. The handle of the invention comprises two U-shaped members having first leg portions which are pivotal to a central upward extension of a front frame of the baby carriage. The handles may be oriented so that they extend outwardly in respective opposite directions for pushing the baby carriage or they may be oriented so that they are folded together into an overlapping relationship so that they form a U-shaped extension which may be hooked over the operator's arm so that the baby carriage may be easily carried.

In the preferred form of the invention the front frame which carries at its lower end, a front wheel set is provided with a holding bracket, or collar, which permits the front frame to be folded in half. The portion of the frame which carries the lower wheel set also carries a rod which holds a rear wheel which may be pivoted inwardly toward the front wheel set. In addition, the rear wheel rod may be shifted or rotated so that the rear wheel which carries may be oriented out of the axial running position into a cross position, for example, for anchoring the baby carriage against movement.

Accordingly, it is an object of the invention to provide an improved baby carriage which is collapsible and which includes a handle which may be oriented in either a pushing position or in a closed position in which the handle forms an umbrella type end which may be carried on an arm of a person.

A further object of the invention is to provide an inexpensive carriage frame which includes a collapsible forward frame which carries a front wheel set and a rear wheel rod which supports a rear wheel which may be pivoted with its wheel into a collapsed position against the front wheel set and which also may be pivoted about its axis to shift the rear wheel which it supports out of the running direction alignment and which includes a handle which may be shifted to extend with respective U-shaped portions in respective outer opposite directions or may be shifted inwardly so that the U-shaped portions are overlapped so that they may be hung over a person's arm.

A further object of the invention is to provide a baby carriage which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

In the drawings:

FIG. 1 is a side elevational view of a baby carriage constructed in accordance with the invention;

FIG. 2 is a partial rear elevational view of the upper portion of the baby carriage shown in FIG. 1;

FIG. 3 is an enlarged perspective view showing the handle mounting for the baby carriage;

FIG. 4 is a section taken along the line IV—IV of FIG. 3; and

FIG. 5 is a side elevational view of the baby carriage shown in a collapsed position with the handle oriented in a carrying position.

GENERAL DESCRIPTION OF THE PREFERRED EMBODIMENT

Referring to the drawings in particular, the invention embodied therein comprises a baby carriage which comprises a front frame assembly generally designated 10 which includes a lower end frame part 1 which carries a front wheel set F, which advantageously comprises two or more wheels. The lower frame portion 1 has a bracket 12 which is pivoted at 14 to an upper frame portion 1' which includes frame legs 3 and 4 which converge inwardly toward the top and are welded together at S. The lower frame may be held so that it extends in substantially the same plane as the upper frame 1', by engaging an upper end part 1a through a displaceable collar a to orient the parts as shown in FIG. 1. Collar a may be shifted upwardly off the end 1a to permit the two parts to be folded together in the direction of the arrow 18 shown in FIG. 1, so that the parts may be oriented in the collapsed position whown in FIG. 5.

The baby carriage is provided with one or more rear wheels R, each of which are carried on rod members 20 which are resiliently supported by a spring 20a in tubular members 2. The tubular members 2 are pivoted at 2a to a bracket 22 which is carried on the lower frame portion at the front frame 1. The rods 2 for the rear wheel R may be shifted in the direction of the arrow 24 to collapse the carriage by orienting the rear wheels so that they are adjacent the front wheels in the collapsed position shown in FIG. 5. As a further feature of the construction, the tubular member 2 may be rotated in its mounting on the bracket 22 by shifting a lever extension 2b at its upper end in order to position the rear wheels so that they are not aligned in the running direction but in which they extend crosswise for the purpose of holding the carriage against movement for anchoring it in a fixed position if so desired.

In the embodiment shown, the upper and lower frames 1 and 1' together support seat frame work 26 which in the embodiment shown includes a cloth seat frame 28 which has a top portion 28a which is looped over the converging ends of the frame parts 3 and 4.

In accordance with the invention, the baby carriage includes a combined carrying and pushing handle generally designated 3 which includes two U-shaped handle members 32 and 34 each of which includes a first leg portion 32a, 34a which is rotatably supported in upper extensions 3a and 4a of the front frame 10. The handle parts 32 and 34 may be oriented as indicated in FIG. 2 in which they extend outwardly in respective opposite directions with second leg portions 32b and 34b extending downwardly and in which they are in a pushing orientation. Pins P are carried on each of the leg portions 32a and 34a and they extend through slots F of the tubular extensions 3a and 4a. The handles 32 and 34 may be rotated to a collapsed or overlapped position shown in FIG. 5, in which they form umbrella-handle type elements which may be looped over a person's arm as shown in dotted lines b. The slots F permit the handles to be pivoted in the direction of the arrow 38 shown in FIG. 2, to the dotted line carrying position shown in dotted lines in FIG. 1 and solid lines FIG. 5.

While a specific embodiment of the invention has been shown and described in detail to illustrate the application of the principles of the invention, it will be understood that the invention may be embodied otherwise without departing from such principles.

What is claimed is:

1. A baby carriage comprising a front frame having spaced apart legs adapted to carry a seat therebetween and having a lower end portion, a wheel rotatably supported on said lower end portion of each leg, at least one rear wheel supporting rod having a rear wheel rotatably supported thereon, a bracket carried on said front frame spaced upwardly from said front wheels and holding said rear wheel support rod, said rear wheel support rod being pivotal on said bracket between an obliquely and downwardly extending rear operative position to a forward position in which said rod with said rear wheel are collapsed adjacent said front frame, said front frame also having an upper portion with an intermediate upwardly converging section connected upwardly with two substantially parallel closely spaced terminal leg end portions which are secured together, and a combined carrying and pushing handle comprising two substantially U-shaped members each having a first leg rotatable in a respective one of said terminal leg end portions and including an intermediate web portion and a second leg portion connected to said intermediate web portion, said first leg portion being pivotal towards the selectively positioned said web portions to extend outwardly in respective opposite directions to form pushing handles and being rotatable on said terminal leg end portions to position said handles with said leg portions and said web portion in overlapping aligned relationship forming a carrying cane handle, and means for holding said handles in each of said carrying cane handle and pushing handle positions.

2. A baby carriage, according to claim 1, wherein said front frame includes an upper and lower portion which are pivoted together, means for holding said upper and lower portion so that they extend substantially in the common plane and which is releaseable to permit the collapsing of said upper and lower portion into juxtaposition.

3. A baby carriage according to claim 1, wherein said terminal leg end portions are arranged in side by side abutment and secured by welding.

4. A baby carriage, according to claim 3, wherein said rear wheel support rod is pivotal and rotatable on said bracket for pivotal movement in a forward and rear direction and also is also mounted in a rotatable manner in order to orient said rear wheel selectively in an axially aligned running position or in a non-axial aligned transverse holding position.

5. A baby carriage according to claim 1, wherein the width of said handles is such that when they are in a pushing handle position extending transversely in opposite directions they are substantially even with the width of said carriage at the location of the carriage seat.

6. A baby carriage according to claim 1, wherein said bracket includes a hollow tube receiving portion, said rear wheel support rod extending into said hollow tube support portion, and spring means resiliently supporting said support rod in said hollow tube portion.

* * * * *